United States Patent Office 2,967,138
Patented Jan. 3, 1961

2,967,138

BUTYL RUBBER COMPOUNDED WITH RADIO-POLYMERIZED ALKANES

George E. Serniuk, Roselle, and John Rehner, Jr., Westfield, N.J., assignors to Esso Research and Engineering Company, a corporation of Delaware No Drawing. Filed Apr. 15, 1957, Ser. No. 652,704

5 Claims. (Cl. 204—154)

This invention relates to a composition containing a major proportion of polyisobutylene and a minor amount of a radio-polymerized alkane.

In brief compass this invention proposes a composition comprising a major proportion of polyisobutylene having a molecular weight in the range of $5 \times 10^4$ to $5 \times 10^6$ and 1 to 12 wt. percent, preferably 5 to 10 wt. percent, of a polymer obtained by the radio-polymerization of a $C_{12}$ to $C_{20}$ paraffin. Preferably the polyisobutylene is first copolymerized with a minor amount of another diolefin monomer to obtain a butyl rubber.

The compositions of this invention have improved ozone resistance and extrudability, as compared to conventional butyl rubbers. Because of these improved properties, these new compositions are specially suitable for forming extrusions such as those used for window channels in automobiles for insulating wires, for forming hose, etc.

While the radio-polymerized alkanes can be compounded with pure polyisobutylene, it is preferred to use polyisobutylene that has been copolymerized with a diolefin, so as to obtain a butyl rubber. The butyl rubber is prepared at low temperatures with a Friedel-Crafts catalyst. The minor component of the copolymer is preferably 0.5 to 5 wt. percent of a conjugated diene having from 4 to 14 carbon atoms per molecule. The preferred dienes are butadiene, pentadiene, cyclopentadiene, isoprene, and dimethylbutadiene, with isoprene being preferred. The isobutylene and conjugated diene are mixed in the ratio of a major proportion of isobutylene and a minor proportion of conjugated diene, the preferred range being from 1 to 10 parts of conjugated diene to 99 to 90 parts by weight of isobutylene.

The mixture of monomers is cooled to a temperature within the range of about −40° C. to −164° C. The cold mixture is then polymerized in the presence of a diluene-refrigerant and a Friedel-Crafts catalyst. The catalyst is preferably in a liquid or dissolved form. The polymerization proceeds rapidly to yield the desired polymer which precipitates out from the solution in the form of a flocculent white solid, having many of the physical characteristics of raw gum rubber. When the polymerization has reached the desired stage, the rubbery material is conveniently recovered by discharging the whole mixture into warm water, which may contain alcohol or other material to inactivate the catalyst. The warm water flashes off the excess refrigerant from the polymerized olefins. The polymer is recovered by straining or filtering, or by other means and then is dried. The method of manufacturing the rubber is more fully described in U.S. 2,356,128, Thomas and Sparks. Other means of copolymerizing the monomers can, of course, be used.

The butyl rubber used in this invention has a molecular weight in the range of 50,000 to 5,000,000 and a Wijs iodine number in the range of 6 to 17, preferably in the range of 10 to 13. In the preferred embodiment wherein the copolymer contains isoprene, the isoprene content is in the range of 1 to 3.5 wt. percent with 1.78 to 2.32 wt. percent being preferred.

The polymerized paraffins compounded with the butyl rubber according to this invention are obtained by exposing paraffins to high energy ionizing radiation. While pure paraffins having a chain length of 12 to 20 carbon atoms can be used, it is more practical to use substantially pure paraffins or mixtures of paraffins. The feed stock to the radio-polymerization step can be obtained from petroleum sources, as by the separation of a paraffinic crude. Any convenient method can be used to obtain the paraffins such as distillation, extraction, absorption, adsorption, filtering and the like. The alkanes are preferably obtained by solvent (propane or ketone) dewaxing processes. The alkanes can be obtained from a variety of crude oils such as for example East Texas, Panhandle, Louisiana, San Joaquin, Mid-Pennsylvania, and the like.

While some dilution of reactants is permissible, it is preferred that the paraffinic content of the feed stock be at least above 80 wt. percent. The paraffins can be straight or branch-chain, although the straight chain paraffins are preferred. The feed mixture to the radio polymerization zone can contain up to 20 wt. percent of olefins of the same carbon chain length as the paraffins or of lower carbon chain length. It is particularly preferred to add to the feed mixture 5 to 15 wt. percent of olefins having 2 to 6 carbon atoms. The feed mixture can contain some naphthenes and aromatics, which can be present to the extent of 5 wt. percent or less.

By high energy ionizing radiation is meant radiation from terrestrial sources consisting of photons having a wave length less than 50 A. such as gamma and X-rays, rapidly moving charged or uncharged particles of an atomic or sub-atomic nature having an energy about 30 ev. such as beta rays, and neutrons, of sufficient intensity so the dose rate is at least $10^{-3}$ kwh. per hour per pound of product. Expressed as pure gamma radiation the dose rate is in the range of $10^5$ to $5 \times 10^7$ megaroentgens/hr. This excludes radiation such as cosmic, and ultra-violet, which are ineffectual for the purposes of this invention.

High energy ionizing radiation can be obtained from nuclear reactors, artificial accelerators such as Van de Graaff generators, from X-ray machines, from waste materials from nuclear reactors, such as spent fuel elements, or portions thereof, or from artificially produced isotopes, such as cobalt 60. The dose received by the polymerized alkane product for all types of radiation is in the range of $10^{-3}$ to 10 kwh. per pound, preferably 1 to 3 kwh./lb.

The alkane feed mixture can be exposed to the radiation either batch wise or continuously. When using a radioisotope the feed can be flowed in or around the radioisotope in suitable conduits or containers.

It is preferred to use the radiation obtained from a nuclear reactor, such as an atomic pile, which comprises mixed neutrons and gamma rays as the principal effective radiation. The reactants can be flowed in pipes through, around or near the fissionable material. Moderators for the reactor such as carbon, water or hydrocarbons can be employed. In some cases, the feed stream itself can serve as a moderator. With a nuclear reactor, it is preferred to have a nuetron flux in the reaction zone above at least $5 \times 10^{11}$ neutrons per centimeter squared per second (n./cm.²/sec.) to achieve an efficient polymerization rate.

The radiation is preferably carried out in liquid phase and for that reason the pressure is preferably sufficient to maintain substantially liquid phase conditions, although it may range from 10 to 1000 p.s.i. or more. The temperature is preferably below thermal cracking temperatures, i.e., below 700° F., although it can range from 0° to 900° F. The preferred temperature is in the range of 250° to 400° F. The time of treatment, which depends upon the radiation intensity, is sufficient to obtain the above dosages and usually lies in the range of 10 to $10^4$ minutes.

Preferably the conversion of the alkane feed stock is carried out to an extent sufficient to obtain at least 75 wt. percent of a product suitable for incorporation into the butyl rubber.

Materials that give off secondary radiation upon neutron capture or proton incidence such as boron 10, lithium 6, cadmium 113, barium 9, can be used during the radiopolymerization if desired. They can be used as pure or concentrated isotopes or the natural elements containing these isotopes can be used. The materials can exist as chemical compound. They can be carried on solids, or exist as distinct solids in themselves, or can be used in solution, e.g., tri-n-dodecylborate can be used.

The polymerized alkane product obtained by this radiolysis is insoluble in all solvents tested, e.g.—less than 1 wt. percent is solubilized by hot heptane and can be considered to have an indefinitely large molecular weight, i.e. the material is a gel. See Charlsby, Proc. Roy-Society (London), vol. 222A, pp. 60–74, February 23, 1954, especially page 62.

Generally, a range of products is obtained from the polymerization zone, and the material used in the composition of this invention can be separated by customary means such as distillation and filtration. A portion of the product lighter than that desired can be recycled to be further polymerized.

The butyl rubber and the alkane polymer are compounded simply by mixing as in a Banbury mixer or on conventional rubber mills. Another technique which is less preferred is as follows: the butyl rubber is dissolved in a solvent, e.g., naphtha, or benzene, the alkane polymer is mixed with this solution, and the mixture of the butyl and the alkane polymer is then thrown out of solution by addition of methanol, ethanol, or acetone and oven-dried to get rid of residual solvents.

During the mixing of these two components, other conventional materials can be added, such as fillers, accelerators, vulcanizing agents, stabilizers, softening agents, and other commonly used rubber compounding ingredients. Examples of these materials are carbon blacks, silicas, clays, whiting, tetramethyl thiuram monosulfide or disulfide, mercaptobenzothiazole, tellurium diethyl dithiocarbamate, dibenzothiazyl disulfide, aromatic dinitroso derivatives, sulfur, zinc oxide, zinc stearate, stearic acid, sulfur, mineral oils, and other rubber compounding ingredients well known in the art.

After being compounded, the butyl rubber, alkane polymer and other materials, if any, are then formed into desired article by customary means such as extrusion and molding. Useful articles obtained from this new composition are automotive inner tubes, tires, hose, belts and gaskets. Generally speaking, any articles for which butyl rubber is suitable can be made with the butyl rubber alkane polymer compositions of this invention.

After being formed, the articles or compositions can then be vulcanized or cured by methods well known to the art. For example, articles can be formed in a vulcanizing press at 250–350° F.

EXAMPLE

A commercial butyl rubber (ENJ–325) formed from isobutylene and isoprene and having an iodine number of 13.4–15 cgs./gm. and a Mooney viscosity of 35–50 (8' and 212° F.) was used in this example.

The alkane polymer used in this example was obtained by the polymerization of cetane (n-hexadecane) in a nuclear reactor. The air-cooled natural uranium graphite moderated research reactor at the Brookhaven National Laboratories was used to irradiate the cetane. The reactor was operating at a total power of about 24 megawatts at the tome of these experiments. The thermal neutron flux in the reaction zone was $2.5 \times 10^{12}$ n./cm.$^2$/sec. The fast neutron flux (greater than 1 mev.) was $0.5 \times 10^{12}$ n./cm.$^2$/sec., and the gamma dosage was $1.6 \times 10^6$ roentgens per hour.

The reactor was approximately a 20' x 20' x 20' lattice of graphite with fillers of 1" diameter aluminum clad uranium rods, spaced evenly through the reactor and extending from the north to south faces of the core. The core was completely surrounded by 5 feet of concrete shielding. The sample holes used for irradiation were horizontal 4" square holes extending through the 5' concrete shield and into the carbon core for a distance of 10 feet. Normal operating temperatures in the experimental hole were about 250°–400° F.

1000 cc. of cetane contained in a 3" diameter aluminum container were inserted into the experimental hole. The radiation was continued for 10 days until 2–3 B.t.u. of radiation per pound of product had been absorbed. 100 wt. percent, based on cetane charged, of converted materials was recovered from the aluminum container. This material was separated to obtain 90 wt. percent of a rubbery polymer.

Blends of the above butyl rubber and polymerized alkane were made up. Blend "A," the control composition, was compounded as follows:

| | |
|---|---|
| Rubber | 100 |
| Medium processing channel carbon black (Kosmobile 66) | 50 |
| Stearic acid | 1 |
| Zinc oxide | 5 |
| Sulfur | 2 |
| Tellurium diethyl dithiocarbamate (Tellurac) | 1 |

The above composition is expressed in parts by weight with the rubber being 100.

Composition "B" comprised 100 parts of the control composition "A," plus 5 parts of the cetane polymer, and composition "C" comprised 100 parts of composition "A" plus 10 parts of the cetane polymer. These compositions were vulcanized for 60' at 307° F. The vulcanizates showed the properties summarized in Table I.

*Table 1*

| | A | B | C |
|---|---|---|---|
| Electrical Resistivity, ohm-cm.$^2$ | $8.286 \times 10^7$ | $1.185 \times 10^8$ | $1.605 \times 10^8$ |
| Modulus at 300% Elong | 2,060 | 1,900 | 1,800 |
| Tensile, p.s.i | 2,120 | 2,175 | 2,175 |
| Elongation, Percent | 310 | 350 | 370 |

These data indicate that the butyl rubber containing the cetane polymer exhibits a higher resistivity value. This indicates a better dispersion of the carbon black. Although the moduli values for the compositions "B" and "C" were somewhat lower than for the control, the strength and length of the blended compositions were equal to or higher than that of composition "A."

Tubes were made from the three compositions using a #½ Royle screw type extruder. The screw speed was 80 r.p.m., the extruder head temperature was 220° C., the die diameter was 0.4 inch, and the pin diameter was 0.3 inch.

The tubes obtained by this method of extrusion were examined for smoothness, and rate of extrusion. This data is reported in Table II.

*Table II*

| Composition | Rate of Extrusion, g./inch | Appearance of Tube |
|---|---|---|
| A | 2.6823 | Coarse. |
| B | 3.3975 | Fairly Smooth. |
| C | 2.0785 | Smooth. |

The three compositions were subjected to an ozone test. This test was carried out as follows:

Micro dumbbells were formed by a procedure described by B. S. Garvey in I.E.C. 34, 1320-3 (1942), with the exception that the mold dimensions were 1¾" x 2½" and the dumbbell dimensions were: thickness, .020 to .025", and cross section, 0.1". The dumbbells were clamped onto a screw driven expansion frame and stretched to 50% extension. The specimens were allowed to remain under stress for ½ hour at room temperature before being placed in a bell jar containing air with an ozone concentration of 0.2 volume percent. The elapsed time to initial cracking and to break were noted.

The results of these azone tests are given in Table III.

Table III

| Composition | Time in Minutes to— | |
|---|---|---|
| | Start of Cracking | Breaking |
| A | 17, 18½ } av. 17¾ | 20, 19¼ } av. 19⅝ |
| B | 19, 23 } av. 21 | 20½, 25½ } av. 22⅞ |
| C | 11, 11 } av. 11 | 12⅝, 12½ } av. 12⅝ |

Table III shows that composition "B" is comparable to or a little better than composition "A."

The three tables taken together show that the amount of cetane polymer that should be incorporated in the butyl rubber is in the range of about 1–12%. At 5% the extrudability of the rubber composition is not as good as when the concentration is 10 wt. percent, while with the higher concentration of cetane polymer, the effect on ozone resistance is somewhat undesirable.

Having described this invention, what is sought to be protected by Letters Patent, is succinctly set forth in the following claims.

What is claimed is:

1. A process comprising irradiating a $C_{12}$ to $C_{20}$ paraffin with high energy ionizing radiation at a dose rate of at least $10^{-3}$ kwh. per hour per pound until a total dose in the range of $10^{-3}$ to 10 kwh. per pound has been received, separating from the material so irradiated an insoluble gel having an indefinitely large molecular weight, the yield of said gel being at least 75 wt. percent based on paraffin feed, compounding in the range of 1–12 wt. percent of said insoluble gel with a major portion of a copolymer of a major proportion of isobutylene and a minor proportion of a conjugated diene, said copolymer having a molecular weight in the range of $5 \times 10^4$ to $5 \times 10^6$ and curing the resulting admixture.

2. The process of claim 1 wherein said copolymer is a copolymer of isobutylene and in the range of 0.5 to 5 wt. percent of a conjugated diene.

3. The process of claim 1 wherein said admixture also has compounded therewith minor amounts of other conventional rubber compounding ingredients.

4. The process of claim 1 wherein said high energy ionizing radiation comprises neutrons at a flux above $5 \times 10^{11}$ n./cm.$^2$/sec. and gamma rays obtained from a nuclear reactor.

5. A process comprising irradiating cetane at a temperature in the range of 250° to 400° F. with mixed neutrons and gamma rays at a dose rate about $10^{-3}$ kwh. per pound per hour until in the range of 1–3 B.t.u.'s of energy per pound has been received, separating from the material so irradiated an insoluble gel having an indefinitely large molecular weight, the yield of said insoluble gel being at least 75 wt. percent based on cetane feed, compounding in the range of 5–10 wt. percent of said insoluble gel with a major proportion of an isobutylene-isoprene copolymer having a molecular weight in the range of 50,000 to 5,000,000, the isoprene in said copolymer being present in an amount in the range of 1 to 3.5 wt. percent, and curing the resulting admixture.

References Cited in the file of this patent

UNITED STATES PATENTS

| | | |
|---|---|---|
| 2,516,848 | Brasch | Aug. 1, 1950 |
| 2,519,796 | Sperbert et al. | Aug. 22, 1950 |
| 2,557,642 | Dudley | June 19, 1951 |
| 2,721,185 | Schulze et al. | Oct. 18, 1955 |
| 2,743,223 | McClinton et al. | Apr. 24, 1956 |
| 2,823,194 | McKey et al. | Feb. 11, 1958 |
| 2,835,644 | Nelson et al. | May 20, 1958 |

OTHER REFERENCES

Charlesby: Proc. Roy. Society (London), vol. 222A, pp. 60–74, February 23, 1954.

Schildknecht: Polymer Processes, vol. X, Interscience Pub. Inc., N.Y. (1956), pp. 679–722.